United States Patent [19]

Senoo

[11] Patent Number: 5,025,058

[45] Date of Patent: Jun. 18, 1991

[54] FLAME-RESISTANT NON-DRYING PUTTY COMPOSITION

[75] Inventor: Atsuyoshi Senoo, Tokyo, Japan

[73] Assignee: The Furukawa Electric Co., Ltd., Tokyo, Japan

[21] Appl. No.: 527,563

[22] Filed: May 23, 1990

[51] Int. Cl.⁵ .......................... C08K 3/10; C09K 21/00
[52] U.S. Cl. ..................................... 524/436; 524/437;
524/451; 524/532; 524/534; 524/296; 524/140;
524/574; 524/575; 252/601
[58] Field of Search ............... 524/451, 436, 437, 491,
524/500, 532, 534

[56] References Cited

U.S. PATENT DOCUMENTS 4,822,654  4/1989  Takemura et al. .................. 524/134

FOREIGN PATENT DOCUMENTS

| 2552464 | 5/1977 | Fed. Rep. of Germany | 524/534 |
| 56-106934 | 8/1981 | Japan | 524/437 |
| 57-131262 | 8/1982 | Japan . | |
| 01-135895 | 4/1989 | Japan . | |
| 667575 | 6/1979 | U.S.S.R. | 524/534 |
| 1562835 | 3/1980 | United Kingdom . | |
| 2092599 | 8/1982 | United Kingdom . | |

Primary Examiner—Joseph L. Schofer
Assistant Examiner—Mark Sweet
Attorney, Agent, or Firm—Frishauf, Holtz, Goodman & Woodward

[57] ABSTRACT

A flame-resistant non-drying putty composition is prepared by adding 2 to 20 parts by weight of an unvulcanized solid rubber, 10 to 50 parts by weight of a plasticizer, 300 to 800 parts by weight of a metal hydrate, 20 to 200 parts by weight of a foliated talc, and 0.5 to 5 parts by weight of an organic fiber to 100 parts by weight of one type of liquid resin having a viscosity of 5,000 to 200,000 centipoise at room temperature or a mixture of two or more types thereof and kneading the resultant mixture.

12 Claims, No Drawings

FLAME-RESISTANT NON-DRYING PUTTY COMPOSITION

BACKGROUND OF THE INVENTION

1. Field of the Invention

The present invention relates to a flame-resistant non-drying putty composition.

2. Description of the Related Art

As a flame-resistant non-drying putty composition for shielding smoke or flame generated when a fire occurs in cable penetrating parts formed at the wall and the like, a composition obtained by adding an inflammable powder such as a metal hydrate and antimony trioxide to a liquid resin as a binder and mixing an inorganic fiber such as asbestos or a glass fiber as a reinforcing fiber in the resultant material was conventionally used. The use of asbestos, however, poses a problem since asbestos is a carcinogenic substance. In addition, since a glass fiber is a skin irritant substance, the use of a glass fiber is also problematic. Currently, therefore, an inflammable organic fiber such as a phenolic fiber is used in place of these inorganic fibers. Such an organic fiber, however, has high rigidity and high strength. If a large amount of such an organic fiber is added, therefore, kneading of a flame-resistant non-drying putty composition is hindered. If, however, an addition amount of the organic fiber is too small, a flame-resistant non-drying putty composition cannot be satisfactorily reinforced to result in poor stability in shape.

Published Unexamined Japanese Patent Application No. 57-131262 discloses a flame-resistant non-drying putty composition using an asbestos fiber and phenol. Since, however, this flame-resistant non-drying putty composition uses comparatively large amounts of asbestos and phenolic fibers, its processing operability is poor. In this case, even if an asbestos fiber as an injurious substance is omitted and only a phenolic fiber is added, the processing operability is still unsatisfactory. If, however, an addition amount of the phenolic fiber is reduced, stability in shape of the flame-resistant non-drying putty composition is degraded.

SUMMARY OF THE INVENTION

It is an object of the present invention to provide a flame-resistant non-drying putty composition having excellent kneading processability and site operability.

The present invention is a flame-resistant nondrying putty composition prepared by adding 2 to 20 parts by weight of an unvulcanized solid rubber, 10 to 50 parts by weight of a plasticizer, 300 to 800 parts by weight of a metal hydrate, 20 to 200 parts by weight of a foliated talc, and 0.5 to 5 parts by weight of an organic fiber to 100 parts by weight of one type of liquid resin having a viscosity of 5,000 to 200,000 centipoise at room temperature or a mixture of two or more types thereof and kneading the resultant mixture.

Examples of the liquid resin are one type or a mixture of two or more types selected from the group consisting of liquid chloroprene, ethylenepropylene rubber (EPR), polybutadiene, polybutene, and polyisoprene. In this case, the liquid resin need not be one type but, for example, a small amount of a high-viscosity liquid polybutene may be mixed with a liquid polybutadiene having a comparatively low viscosity. The viscosity of the liquid resin is limited to 5,000 to 200,000 centipoise for the following reason. That is, if the viscosity is less than 5,000, the obtained putty composition is unstable as a binder for a putty to cause blooming, deformation, or removal. If the viscosity exceeds 200,000, not only kneading of a putty composition is made difficult, but also a mixing amount of a filler is limited, resulting in a putty composition not having high inflammability.

As the unvulcanized solid rubber, one or more types of rubber selected from the group consisting of chloroprene, acrylonitrie-butadiene rubber (NBR), styrene-butadiene rubber (SBR), ethylenepropylene rubber (EPR), ethylene-propylene rubber terpolymer (EPDM), butyl rubber, and silicone rubber are preferably used. The unvulcanized solid rubber is used in order to prevent a natural flow of the liquid resin, thereby imparting shape stability to the putty composition. For this purpose, in order to improve kneading operability and dispersibility, a rubber having a low Mooney viscosity is preferably used. An addition amount of the unvulcanized solid rubber is limited to 2 to 20 parts by weight for the following reason. That is, if the addition amount is less than 2 parts by weight, no satisfactory addition effect can be obtained. If the addition amount exceeds 20 parts by weight, extension of the putty composition is increased to degrade operability.

As the plasticizer, either a phthalic acid-based plasticizer or a phosphoric acid-based plasticizer is used. The plasticizer is used in order to adjust the viscosity of the liquid resin. In addition, when a putty composition containing a plasticizer is used for a cable, it prevents a plasticizer in a cable sheath from being transferred into the putty composition to avoid degradation in the cable sheath. A mixing amount of the plasticizer is limited to 10 to 50 parts by weight for the following reason. That is, if the mixing amount is less than 10 parts by weight, no satisfactory mixing effect can be obtained. If the mixing amount exceeds 50 parts by weight, the putty composition easily causes blooming.

As the metal hydrate, either aluminum hydroxide or magnesium hydroxide is used. The use of the metal hydrate allows the putty composition to release water of crystallization to absorb heat when it is exposed to a flame in case of a fire or the like, thereby allowing it to exhibit a flame resistance. A mixing amount of the metal hydrate is limited to 300 to 800 parts by weight for the following reason. That is, if the mixing amount is less than 300 parts by weight, no satisfactory mixing effect can be obtained. If the mixing amount exceeds 800 parts by weight, the putty composition becomes harder to degrade its operability.

The foliated talc has a reinforcing effect similar to that of asbestos and improves stability in shape. An example of the foliated talc is mistron vapor talc. A mixing amount of the foliated talc is limited to 20 to 200 parts by weight for the following reason. That is, if the mixing amount is less than 20 parts by weight, no satisfactory mixing effect can be obtained. If the mixing amount exceeds 200 parts by weight, kneading processability is degraded.

The organic fiber is added as a reinforcing agent of the putty composition. Preferable examples of the organic fiber are inflammable fibers such as a phenolic fiber, an aramid fiber, and a carbon fiber, and polynosics subjected to an inflammability treatment. In addition to these fibers, however, flammable fibers such as rayon, nylon, and Tetron can be used as the organic fiber. A mixing amount of the organic fiber is limited to 0.5 to 5 parts by weight for the following reason. That is, if the mixing amount is less than 0.5 parts by weight, no satisfactory reinforcing effect can be obtained. If the mixing amount exceeds 5 parts by weight, processability and operability of the putty composition are degraded.

The flame-resistant non-drying putty composition of the present invention may contain, in addition to the above additives, an aging inhibitor, a stabilizer such as an ultraviolet absorbent, and a coloring agent. The flame-resistant non-drying putty composition of the present invention as described above contains a liquid resin as a main constituent. When the putty composition is filled as a sealing agent for cable penetrating parts formed at the wall or the like, therefore, it is not dried but can maintain a non-drying property even after being left to stand for a long time period. For this reason, the putty composition can achieve a high flame resistance without producing cracks.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

Flame-resistant non-drying putty compositions of Examples 1 to 8 having compositions shown in Table 1 to be presented later were prepared. Putty compositions of comparative examples having compositions also shown in Table 1 were prepared to be compared with the putty compositions of the present invention.

Inflammability, stability in shape, processing operability, and filling operability of each putty composition were checked. These check results are summarized in Table 1.

As is apparent from Table 1, each of the flame-resistant non-drying putty compositions of Examples 1 to 8 is excellent in inflammability, stability in shape, processing operability, and filling operability. The putty composition of the present invention, therefore, is suitable as a sealing material to be used between a cable and a wall of a cable penetrating part formed at the wall since it can easily prevent spread of a fire or the like. This putty composition is thus industrially very advantageous.

Note that numerals (1) to (8) in Table 1 represent the following materials.
(1) DENKA LCR X-050 (DENKI KAGAKU KOGYO K.K.)
(2) polybd R-45 HT (IDEMITSU SEKIYU KAGAKU K.K.)
(3) POLYBUTENE HV-300 (NIHON SEKIYU KAGAKU K.K.)
(4) DENKA CR S-40V (DENKI KAGAKU KOGYO K.K.)
(5) BUTYL 065 (NIHON BUTYL K.K.)
(6) HYDILIGHT H-32 (Showa Denko K.K.)
(7) MISTRON VAPOR TALC (NIHON NISTRON K.K.)
(8) Inflammable Polynosics Tafusel (TOYOBO CO., LTD.)
(9) Tetron Fiber (1 denier 1 mm length) (TORAY INDUSTRIES, INC.)
◉:Excellent
O:Good
∆:Fair
×:Unsatisfactory

Inflammability

Inflammability was determined on the basis of an oxygen index in a JISK7201 test, and values have the following meanings.
More than 70:◉
5 to 70:O
40 to 55:∆
Less than 40:×

Stability in Shape

The flame-resistant non-drying putty composition was coated to have a thickness of 30 mm on a 30 cm long circumferential surface region of a cable having an outer diameter of 10 mm and a length of 50 cm so that two 10 cm long end portions of the cable remained uncovered. The resultant cable was vertically placed in a constant temperature bath at 40° C., and its deformation was checked in this state. Symbols have the following meanings.
The composition was not deformed but maintained its shape more than one month: ◉
The composition was slightly deformed to sag within ten days to one month but was not deformed any further:O
The composition started its deformation within one day to ten days and was gradually largely deformed to be finally removed:∆
The composition was deformed and removed within one day after the test was started:×

Processing Operability

The flame-resistant non-drying putty composition was formed into a sheet having a thickness of about 10 mm and cut into a product having a predetermined shape to check its processing operability. Symbols have the following meanings.
The composition was easily cut by a stainless steel blade: ◉
The composition could be cut by the stainless steel blade although cutting was rather difficult:O
The composition was too rigid to be cut by the stainless steel blade and required repetitive cutting:∆
It was difficult to cut the composition by the stainless steel blade, and a cut surface became nappy:×

Filling Operability

The composition was filled as a sealing material in a cable penetrating part, and ease of filling was checked by penetration of a needle as defined by JISK 2335. The penetration is represented with no units.
40 to 120:◉
30 to 40:O
20 to 30:∆
Less than 20:×

In order to confirm that an effective range of the viscosity of the liquid resin is 5,000 to 200,000 centipoise, flame-resistant non-drying putty compositions of Examples 9 to 11 and Comparative Examples 7 and 8 were prepared by using the mixing ratio of Example 5 and changing the viscosity of the liquid resin as shown in Table 2. Inflammability, stability shape, processing operability, and filling operability of each putty composition were checked. The check results are summarized in Table 2.

As is apparent from Table 2, a liquid resin having a viscosity of 5,000 to 200,000 centipoise is very effective.

Note that numerals (1) to (5) in Table 2 represent the following materials.
(1) POLYBUDADIENE R-15 HT (IDEMITSU SEKIYU KAGAKU K.K.)
(2) POLYBUTADIENE R-45 HT (IDEMITSU SEKIYU KAGAKU K.K.)
(3) POLYBUTADIENE R-45 MA (IDEMITSU SEKIYU KAGAKU K.K.)
(4) KURAPRENE LIR403 (KURARAY ISOPRENE CHEMICAL CO., LTD.)
(5) KURAPRENE LIR410 (KURARAY ISOPRENE CHEMICAL CO., LTD.)

In order to confirm that an effective mixing amount of the solid rubber is 2 to 20 parts by weight, flame-resistant non-drying putty compositions of Examples 12 to 14 and Comparative Examples 9 to 11 were prepared by using the mixing ratio of Example 2 shown in Table 1 and changing the mixing amount of the solid rubber as shown in Table 3 to be presented later. Inflammability, stability in shape, processing operability, and filling operability of each putty composition were checked. The check results are summarized in Table 3.

As is apparent from Table 3, 2 to 20 parts by weight is found to be very effective as a mixing amount of a solid rubber.

Note that numerals (1) and (2) in Table 3 represent the following materials.
(1) JSR NBR N220S (Japan Synthetic Rubber Co., Ltd.)
(2) JSR SBR 1502 (Japan Synthetic Rubber Co., Ltd.)

In order to determine the effect of the plasticizer, flame-resistant non-drying putty compositions of Example 15 and Comparative Example 12 containing plasticizers in mixing amounts shown in Table 4 were prepared by using the mixing ratio of Example 6 shown in Table 1. Inflammability, stability in shape, processing operability, filling operability, and a blooming property of each putty composition were checked. The check results are summarized in Table 4.

As is apparent from Table 4, a phthalic acid-based plasticizer is very effective.

Note that (1) SAMPER 2280 in Table 4 is available from NIHON SUNOIL K.K.

A flame-resistant non-drying putty composition on the surface of which the plasticizer was conspicuously bloomed after kneading is represented by symbol X, and a composition on the surface of which the plasticizer was not bloomed is represented by symbol O.

In order to confirm the talc addition effect, flame-resistant non-drying putty compositions of Example 16 and Comparative Example 13 containing talcs in mixing amounts as shown in Table 5 were prepared by using the mixing ratio of Example 3 shown in Table 1. Inflammability, stability in shape, processing operability, and filling operability of each composition were checked. The check results are summarized in Table 5.

As is apparent from Table 5, the flame-resistant non-drying putty composition of Example 16 containing foliated talc had excellent stability in shape.

Note that (1) TALC SS in Table 5 is available from NIHON TALC K.K.

In order to confirm the organic fiber addition effect, flame-resistant non-drying putty compositions of Examples 17 to 19 containing organic fibers in mixing amounts as shown in Table 6 were prepared by using the mixing ratio of Example 2 shown in Table 1. Inflammability, stability in shape, processing operability, and filling operability of each putty composition were checked. The check results are summarized in Table 6 to be presented later.

As is apparent from Table 6, each of the flame-resistant non-drying putty compositions of Examples 17 to 19 containing the organic fibers had excellent stability in shape. That is, a reinforcing effect of the organic fiber was satisfactorily exhibited.

Note that in Table 6, (1) KAINOL is available from NIHON KAINOL K.K., and (2) KEVLAR 29 is available from Du Pont K.K.

In order to confirm the addition effect of asbestos and organic fibers, flame-resistant non-drying putty compositions of Examples 20 and 21 and Comparative Examples 14 to 18 containing organic fibers or asbestos in mixing amounts a shown in Table 7 to be presented later were prepared. Inflammability, stability in shape, processing operability, and filling operability of each putty composition were checked. The check results are summarized in Table 7.

As is apparent from Table 7, each of the flame-resistant non-drying putty compositions of Examples 20 and 21 containing a predetermined amount of an organic fiber was excellent in all the properties including the stability in shape. Each of the putty compositions of Comparative Examples 14 to 18, however, were poor in processing operability or stability in shape except for the composition containing asbestos.

Additional advantages and modifications will readily occur to those skilled in the art. Therefore, the invention in its broader aspects is not limited to the specific details, representative composition, shown and described herein. Accordingly, various modifications may be made without departing from the spirit or scope of the general inventive concept as defined by the appended claims and their equivalents.

TABLE 1

|  | Example | | | | | | | | Comparative Example | | | | | |
|---|---|---|---|---|---|---|---|---|---|---|---|---|---|---|
|  | (1) | (2) | (3) | (4) | (5) | (6) | (7) | (8) | (1) | (2) | (3) | (4) | (5) | (6) |
| Liquid Chloroprene (1) | 100 | 100 | 100 | 100 | — | — | — | — | 100 | 100 | 100 | — | — | — |
| Polybutadiene (2) | — | — | — | — | 100 | 90 | 80 | 70 | — | — | — | 100 | 100 | 100 |
| Polybutene (3) | — | — | — | — | — | 10 | 20 | 30 | — | — | — | — | — | — |
| Solid Chloroprene (4) | 10 | 15 | 20 | 15 | — | — | — | — | 10 | 10 | 10 | — | — | — |
| Butyl Rubber (5) | — | — | — | — | 10 | 10 | 10 | 10 | — | — | — | 10 | 10 | 10 |
| Dioctylphthalate | 30 | — | — | 30 | 30 | 30 | 30 | 30 | 30 | 30 | 30 | 30 | 30 | 30 |
| Tricresylphosphate | — | 10 | 50 | — | — | — | — | — | — | — | — | — | — | — |
| Aluminum Hydroxide (6) | 400 | 400 | 500 | 300 | 800 | 650 | 600 | 550 | 350 | 480 | 400 | 900 | 250 | 200 |
| Foliated Talc (7) | 100 | 80 | 100 | 150 | 20 | 100 | 100 | 100 | 100 | 10 | 100 | 40 | 200 | 250 |
| Inflammable Polynosics (8) | 2 | — | 1 | 0.5 | 3 | 2 | 2 | 2 | — | 2 | 0.2 | 2 | 2 | 2 |

TABLE 1-continued

|  | Example | | | | | | | | Comparative Example | | | | | |
|---|---|---|---|---|---|---|---|---|---|---|---|---|---|---|
|  | (1) | (2) | (3) | (4) | (5) | (6) | (7) | (8) | (1) | (2) | (3) | (4) | (5) | (6) |
| Tetron Fiber (9) | — | 5 | — | — | — | — | — | — | 10 | — | — | — | — | — |
| Inflammability | ◉ | ◉ | ◉ | ◉ | ◉ | ◉ | ◉ | △ | ○ | ◉ | ◉ | ◉ | x | x |
| Stability in Shape | ◉ | ◉ | ○ | ○ | ○ | ◉ | ◉ | ◉ | ◉ | x | x | ◉ | ◉ | ◉ |
| Processing Operability | ○ | ○ | ◉ | ◉ | ○ | ◉ | ◉ | ◉ | x | △ | ◉ | ◉ | ◉ | ◉ |
| Filling Operability | ◉ | ○ | ◉ | ◉ | ○ | ◉ | ◉ | ◉ | x | ○ | ◉ | x | ◉ | x |

TABLE 2

|  | Example | | | Comparative Example | |
|---|---|---|---|---|---|
|  | 9 | 10 | 11 | 7 | 8 |
| Polybutadiene (1) viscosity = 1,300 cps | — | — | — | 100 | — |
| Polybutadiene (2) viscosity = 5,000 cps | — | 100 | — | — | — |
| Polybutadiene (3) viscosity = 15,000 cps | — | — | 100 | — | — |
| Polyisoprene (4) viscosity = 160,000 cps | 100 | — | — | — | — |
| Polyisoprene (5) viscosity = 320,000 cps | — | — | — | — | 100 |
| Butyl Rubber | 10 | 10 | 10 | 10 | 10 |
| Dioctylphthalate | 30 | 30 | 30 | 30 | 30 |
| Aluminum Hydroxide | 800 | 800 | 800 | 800 | 800 |
| Foliated Talc | 100 | 100 | 100 | 100 | 100 |
| Inflammable Polynosics | 3 | 3 | 3 | 3 | 3 |
| Inflammibility | ◉ | ◉ | ◉ | ○ | △ |
| Stability in Shape | ◉ | ◉ | ◉ | △ | ◉ |
| Processing Operability | ○ | ○ | ○ | ○ | △ |
| Filling Operability | ○ | ○ | ○ | ○ | ○ |

TABLE 3

|  | Example | | | Comparative Example | | |
|---|---|---|---|---|---|---|
|  | 12 | 13 | 14 | 9 | 10 | 11 |
| Liquid Chloroprene | 100 | 100 | 100 | 100 | 100 | 100 |
| Solid Chloroprene | 15 | — | — | — | 30 | — |
| NBR (1) | — | 15 | — | — | — | 35 |
| SBR (2) | — | — | 15 | — | — | — |
| Tricresylphosphate | 10 | 10 | 10 | 10 | 10 | 10 |
| Aluminum Hydroxide | 400 | 400 | 400 | 400 | 400 | 400 |
| Foliated Talc | 80 | 80 | 80 | 80 | 80 | 80 |
| Tetron Fiber | 5 | 5 | 5 | 5 | 5 | 5 |
| Inflammability | ◉ | ◉ | ◉ | ◉ | ◉ | ◉ |
| Stability in Shape | ◉ | ◉ | ◉ | △ | ◉ | ◉ |
| Processing Operability | ○ | ○ | ○ | ○ | x | x |
| Filling Operability | ○ | ○ | ○ | ○ | △ | △ |

TABLE 4

|  | Example 15 | Comparative Example 12 |
|---|---|---|
| Polybutadiene | 90 | 90 |
| Polybutene | 10 | 10 |
| Butyl Rubber | 10 | 10 |
| Paraffin-Based Process Oil (1) | — | 30 |
| Dioctylphthalate | 30 | — |
| Aluminum Hydroxide | 650 | 650 |
| Foliated Talc | 100 | 100 |
| Inflammable Polynosics | 2 | 2 |
| Inflammability | ◉ | ◉ |
| Stability in Shape | ◉ | |
| Processing Operability | ◉ | |
| Filling Operability | ◉ | |
| Blooming Property | ◉ | x |

TABLE 5

|  | Example 16 | Comparative Example 13 |
|---|---|---|
| Liquid Chloroprene | 100 | 100 |
| Solid Chloroprene | 20 | 20 |
| Tricresylphosphate | 50 | 50 |
| Aluminum Hydroxide | 500 | 500 |
| Foliated Talc | 100 | — |
| Needle-like Talc (1) | — | 100 |
| Inflammability | ◉ | ◉ |
| Stability in Shape | ○ | △ |
| Processing Operability | ◉ | ◉ |
| Filling Operability | ◉ | ◉ |

TABLE 6

|  | Example | | |
|---|---|---|---|
|  | 17 | 18 | 19 |
| Liquid Chloroprene | 100 | 100 | 100 |
| Solid Chloroprene | 15 | 15 | 15 |
| Tricresylphosphate | 10 | 10 | 10 |
| Aluminum Hydroxide | 400 | 400 | 400 |
| Foliated Talc | 80 | 80 | 80 |
| Tetron Fiber | 5 | — | — |
| Phenolic Fiber (1) | — | 5 | — |
| Aramid Fiber (2) | — | — | 5 |
| Inflammability | ◉ | ◉ | ◉ |
| Stability in Shape | ◉ | ◉ | ◉ |
| Processing Operability | ○ | ○ | ○ |

TABLE 6-continued

| | Example | | |
|---|---|---|---|
| | 17 | 18 | 19 |
| Filling Operability | ○ | ○ | ○ |

TABLE 7

| | Example | | Comparative Example | | | | |
|---|---|---|---|---|---|---|---|
| | 20 | 21 | 14 | 15 | 16 | 17 | 18 |
| Liquid Chloroprene | 100 | 100 | 100 | 100 | 100 | 100 | 100 |
| Solid Chloroprene | 15 | 15 | 15 | 15 | 15 | 15 | 15 |
| Dioctylphthalate | 20 | 20 | 20 | 20 | 20 | 20 | 20 |
| Aluminum Hydroxide | 300 | 300 | 300 | 300 | 300 | 300 | 300 |
| Magnesium Hydroxide | — | 300 | — | — | — | — | — |
| Foliated Talc | 80 | 80 | — | — | — | — | — |
| Asbestos | — | — | 50 | — | — | — | — |
| Inflammable Polynosics | 5 | 5 | — | 50 | — | 20 | 5 |
| Tetron Fiber | — | — | — | — | 50 | — | — |
| Inflammability | ◎ | ◎ | ◎ | ◎ | ◎ | ◎ | ○ |
| Stability in Shape | ◎ | ◎ | ◎ | ◎ | ◎ | ◎ | △ |
| Processing Operability | ○ | ○ | ○ | x | x | x | ○ |
| Filling Operability | ○ | ○ | ○ | ○ | ○ | ○ | ○ |

What is claimed is:

1. A flame-resistant, non-drying putty composition prepared by adding 2 to 20 parts by weight of an unvulcanized solid rubber, 10 to 50 parts by weight of a plasticizer, 300 to 800 parts by weight of a metal hydrate, 20 to 200 parts by weight of a filiated talc and 0.5 to 5 parts by weight of an organic fiber to 100 parts by weight of one liquid resin having a viscosity of 5,000 to 200,000 centipoise at room temperature or a mixture of two or more resins thereof and kneading the resultant composition.

2. The composition according to claim 1, wherein said liquid resin is one resin or a mixture of two or more resins selected from the group consisting of liquid chloroprene, ethylenepropylene rubber, polybutadiene, polybutene and polyisoprene.

3. The composition according to claim 1, wherein said unvulcanized rubber is rubber selected from the group consisting of chloroprene, acrylonitrile-butadiene rubber, styrene-butadiene rubber, ethylenepropylene rubber, ethylene-propylene rubber terpolymer, butyl rubber, silicone rubber and mixtures thereof.

4. The composition according to claim 1, wherein said plasticizer is selected from the group consisting of a phthalic acid-based plasticizer and a phosphoric acid-based plasticizer.

5. The composition according to claim 1, wherein said metal hydrate is selected from the group consisting of aluminum hydroxide and magnesium hydroxide.

6. The composition according to claim 1, wherein said organic fiber is an inflammable fiber selected from the group consisting of a phenolic fiber, an aramid fiber, a carbon fiber and polynosics subjected to an inflammability treatment.

7. The composition according to claim 1, wherein said organic fiber is a flammable fiber selected from the group consisting of rayon fiber, polyamide fiber and polyester fiber.

8. The composition according to claim 1, which further comprises at least one additive selected from the group consisting of an aging inhibitor, a stabilizer and a coloring agent.

9. The composition according to claim 8, wherein the stabilizer is an ultraviolet absorbent.

10. The composition according to claim 2, wherein said unvulcanized rubber is at least one rubber selected from the group consisting of chloroprene, acrylonitrile-butadiene rubber, styrene-butadiene rubber, ethylene-propylene rubber, ethylene-propylene rubber terpolymer, butyl rubber and silicone rubber; the plasticizer is selected from the group consisting of a phthalic acid-based plasticizer and a phosphoric acid-based plasticizer; the metal hydrate is selected from the group consisting of aluminum hydroxide and magnesium hydroxide; and the organic fiber is selected from the group consisting of a phenolic fiber, an aramid fiber, a carbon fiber, a rayon fiber, a polyamide fiber and a polyester fiber.

11. The composition according to claim 1, wherein the fiber is nylon.

12. A flame-resistant, non-drying putty composition comprising
   2 to 20 parts by weight of an unvulcanized solid rubber,
   10 to 50 parts by weight of a plasticizer,
   300 to 800 parts by weight of a metal hydrate,
   20 to 200 parts by weight of a foliated talc,
   0.5 to 5 parts by weight of an organic fiber and
   100 parts by weight of at least one liquid resin having a viscosity of 5,000 to 200,000 centipoises at room temperature.

* * * * *